United States Patent [19]
Aulanko et al.

[11] Patent Number: 6,026,936
[45] Date of Patent: Feb. 22, 2000

[54] SLIDING SAFETY GEAR

[75] Inventors: Esko Aulanko, Kerava; Ilkka Lempiö, Lahti; Juha Tyllinen, Tervakoski, all of Finland

[73] Assignee: Kone Oy, Helsinki, Finland

[21] Appl. No.: 08/966,034

[22] Filed: Nov. 7, 1997

[30] Foreign Application Priority Data

Nov. 7, 1996 [FI] Finland ..................................... 964484

[51] Int. Cl.⁷ ........................................................ B66B 5/04
[52] U.S. Cl. ........................................... 187/376; 187/372
[58] Field of Search ..................................... 187/372, 376

[56] References Cited

U.S. PATENT DOCUMENTS

| 859,718 | 7/1907 | Abbott | 187/372 |
| 4,538,706 | 9/1985 | Koppensteiner | 187/376 |
| 5,224,570 | 7/1993 | Fromberg | 187/376 |
| 5,782,319 | 7/1998 | Woodruff et al. | 187/376 |

FOREIGN PATENT DOCUMENTS

| 0490090A1 | 6/1992 | European Pat. Off. |
| 925071 | 3/1995 | Germany . |

*Primary Examiner*—William E. Terrell
*Assistant Examiner*—Gene O. Crawford
*Attorney, Agent, or Firm*—Birch, Stewart, Kolasch & Birch, LLP

[57] ABSTRACT

A sliding safety gear designed to brake by gripping an elevator or counterweight guide rail includes a flexible frame surrounding the guide rail in the directions of the guiding surfaces of the guide rail. The frame is provided with a braking surface that meets a first guide surface of the guide rail when the sliding safety gear is braking. Attached to the frame is a force element that meets a second guide surface when the sliding safety gear is braking. The cross-section of the frame of the safety gear is substantially in the shape of the letter C. At least one of the ends of the jams of the C-shape is inside the C-shape.

14 Claims, 6 Drawing Sheets

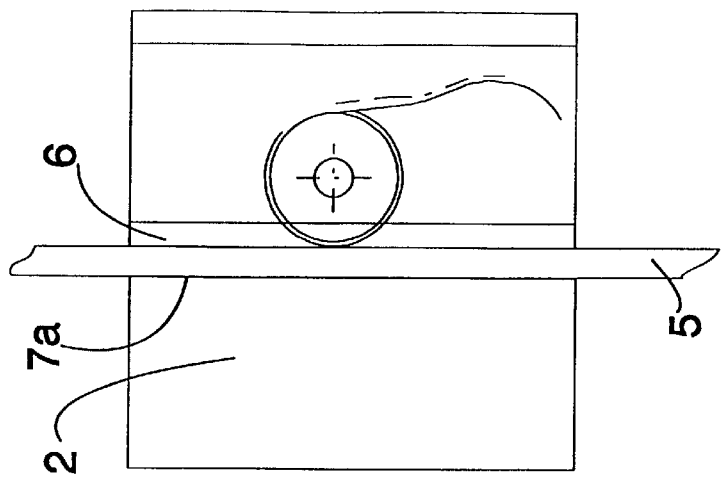
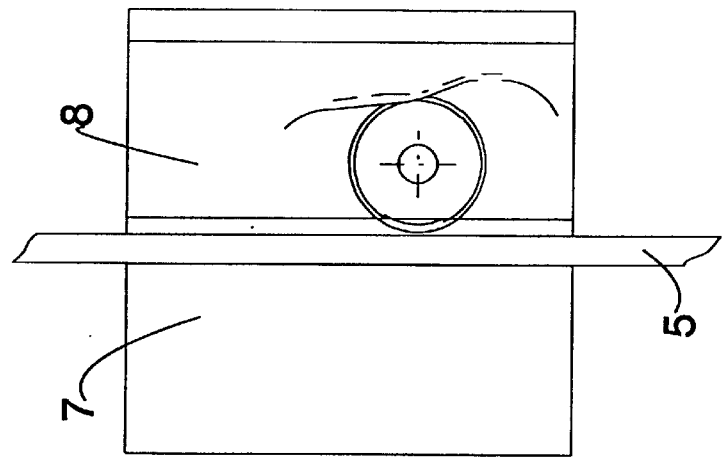
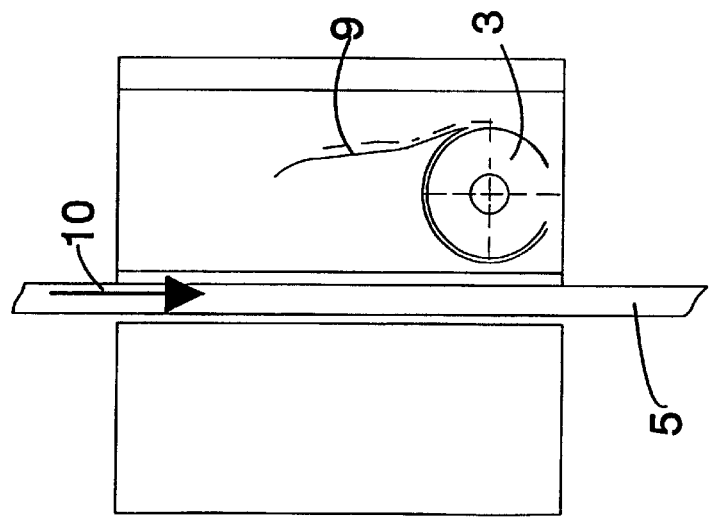

SLIDING SAFETY GEAR

BACKGROUND OF THE INVENTION

1. Field of the Invention

The present invention relates to a sliding safety gear, in particular, a sliding safety gear for elevators.

2. Description of the Background Art

Elevators are equipped with automatic braking devices which act as safety gears designed to stop the elevator if the speed of the elevator rises too much. Conventionally, the braking device used is a gripper type brake that grips a guide rail. Generally, the safety gear is used to stop downward movement. Such a gripping brake can also be used to stop the elevator for other reasons, e.g. when an error in operation results in the elevator leaving a door zone with the doors open. The basic structure of a conventional brake gripping a guide rail, a sliding safety gear, is as follows. The safety gear frame contains a hollow with a braking surface facing towards a guide rail placed in the hollow. Placed in the hollow is also a wedge or a roller, which, mounted on a track in the hollow, is driven against the elevator guide rail when the safety gear is activated. The elevator guide rail is placed between the braking surface and the wedge or roller. The track is so shaped that, when the wedge or roller moves on the track in the direction of the guide rail, the guide rail is pressed by the wedge or roller against the braking surface, thus producing a braking action that stops the elevator car. The safety gear can also be mounted on the counterweight.

The compression applied by the safety gear to the guide rail is set by means of a spring. Via the friction between the braking surface and the guide rail, the magnitude of the compressive force determines the deceleration of the elevator. The use of spring-loaded compression compensates the variations in compressive force occuring during the deceleration. In the course of time, several different technical solutions for an elevator safety gear have been developed. A commonly used safety gear type is a large U-shaped spring made of spring steel, with a wedge which is driven between the ends of the spring when the safety gear is activated. Safety gears of this type are also often provided with a release wedge for easier disengagement from the guide rail. However, the U-shape of such a safety gear opens during the gripping action, which is why the braking surface has only partial contact with the guide rail. Further drawbacks with this type of safety gear are its large size and high price. Safety gears have also been developed in which the safety gear frame is relatively rigid and the springiness of the compression applied by the safety gear to the guide rail is achieved using separate springs. However, these safety gears comprise a large number of separate parts and they are more complex in composition. Such safety gears are lighter than earlier safety gear types, but like these, they are quite expensive.

SUMMARY OF THE INVENTION

To overcome the problems described above and to achieve a safety gear that is better than earlier types, an invention concerning a new type of sliding safety gear is presented. The sliding safety gear of the present invention includes a frame having a C-shape and at least one of the ends of the jams is inside the C-shape.

The advantages achieved by the invention include the following:

The sliding safety gear of the invention is of simple composition and plain construction and contains a small number of separate parts. Therefore, it is also cheap to manufacture.

The sliding safety gear, of the present invention is relatively light and reliable in operation. The safety gear of the present invention is of a construction that does not take up much space. Therefore it is easy to place in the elevator layout and is easy to install. It is suited for use in different types of elevator. Since the structure of the sliding safety gear of the present invention helps prevent misalignment between the guide rail and the braking surface, it causes less wear of the guide rail and is also less liable to wear. Since it is compact in construction and its functions are integrated in a small number of parts, the sliding safety gear is very durable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention is described in greater detail by the aid of a few examples of its embodiments, which in themselves do not limit the sphere of application of the invention, and by referring to the attached drawings, in which:

FIGS. 4–6 illustrate the operation of the safety gear during the gripping action.

DESCRIPTION OF THE PREFERRED EMBODIMENTS

Figure 1:
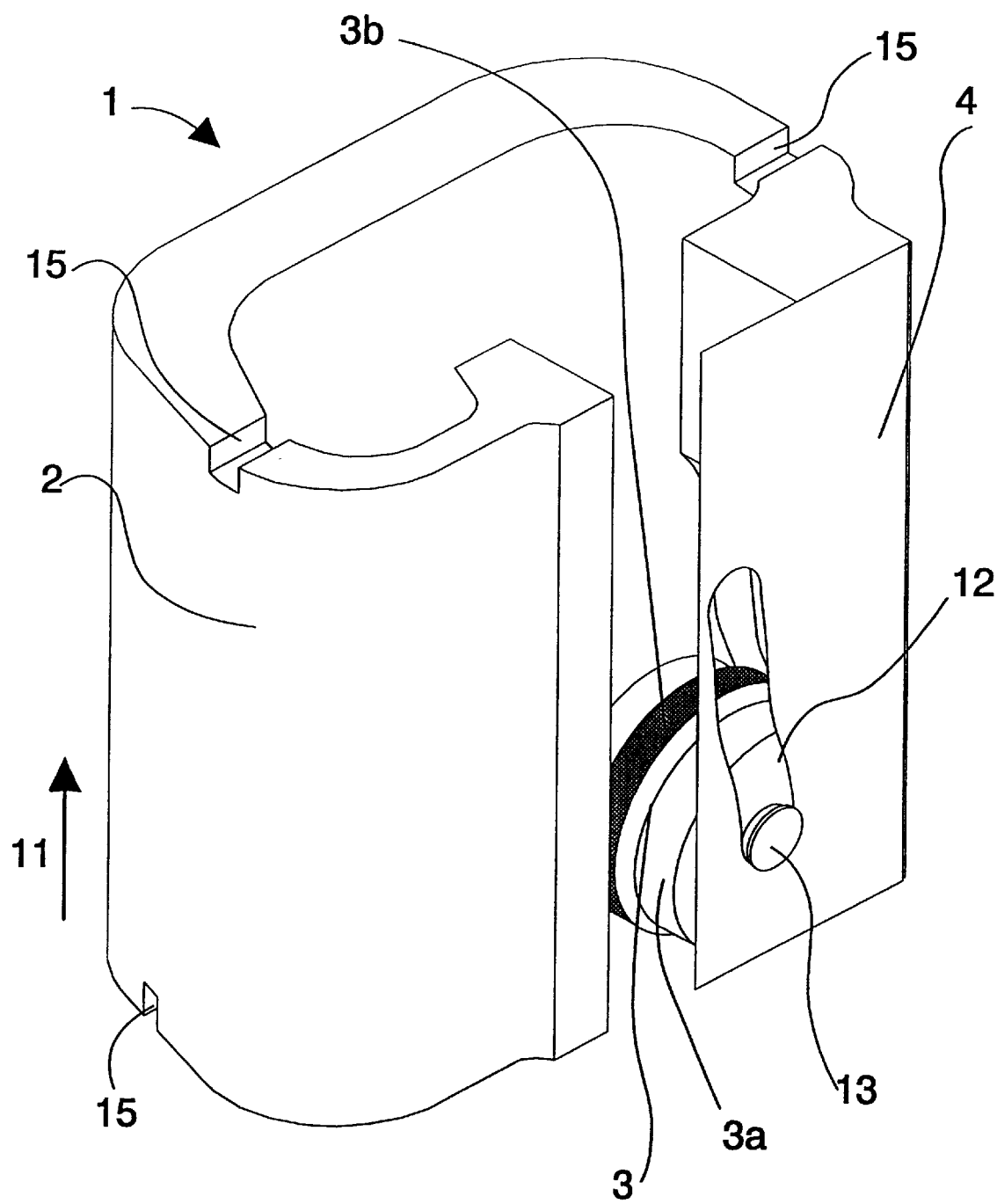
FIG. 1 presents a sliding safety gear according to the invention.
Figure 2:
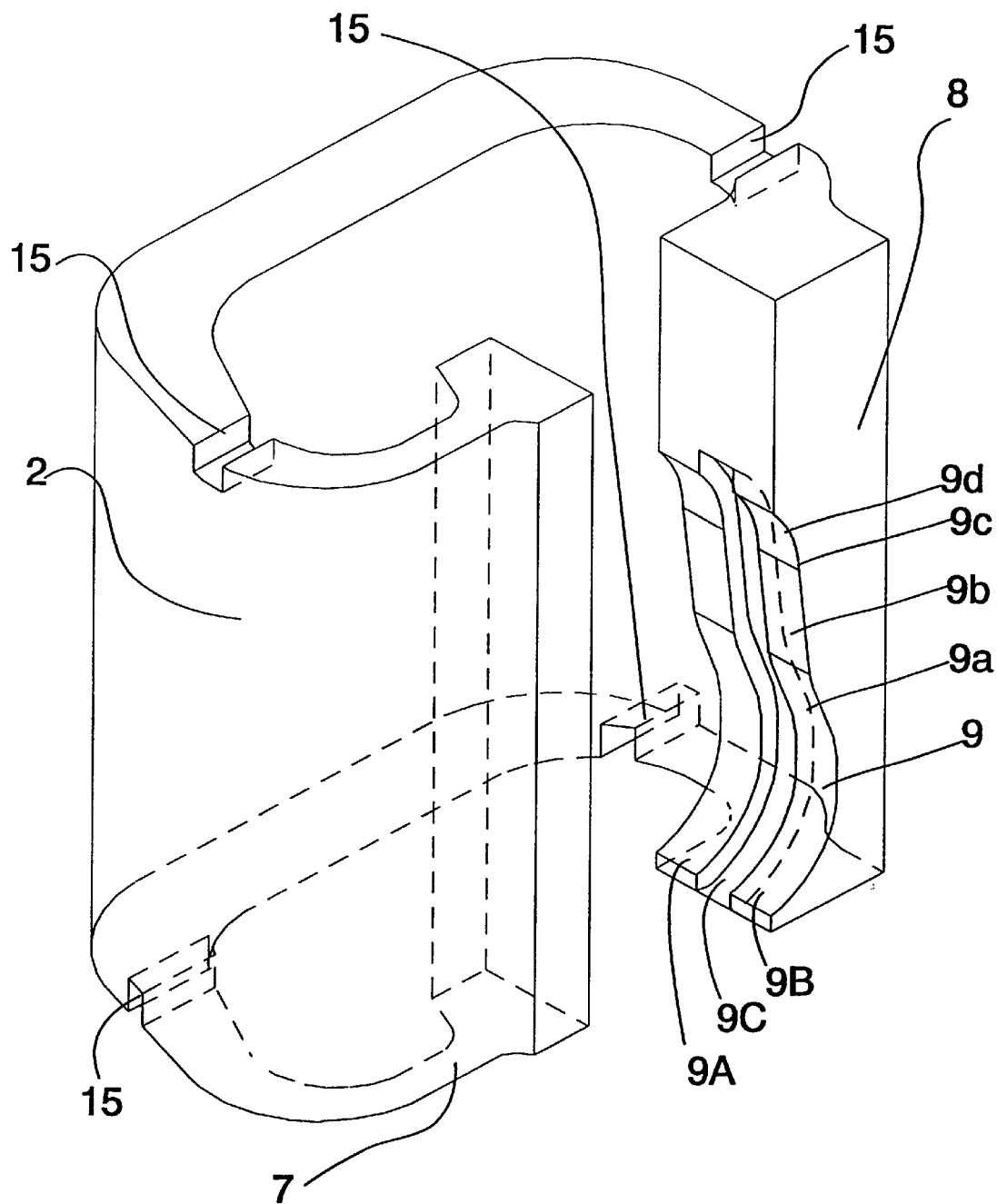
FIG. 2 presents a more detailed view of the frame of the sliding safety gear in FIG. 1.
Figure 3:
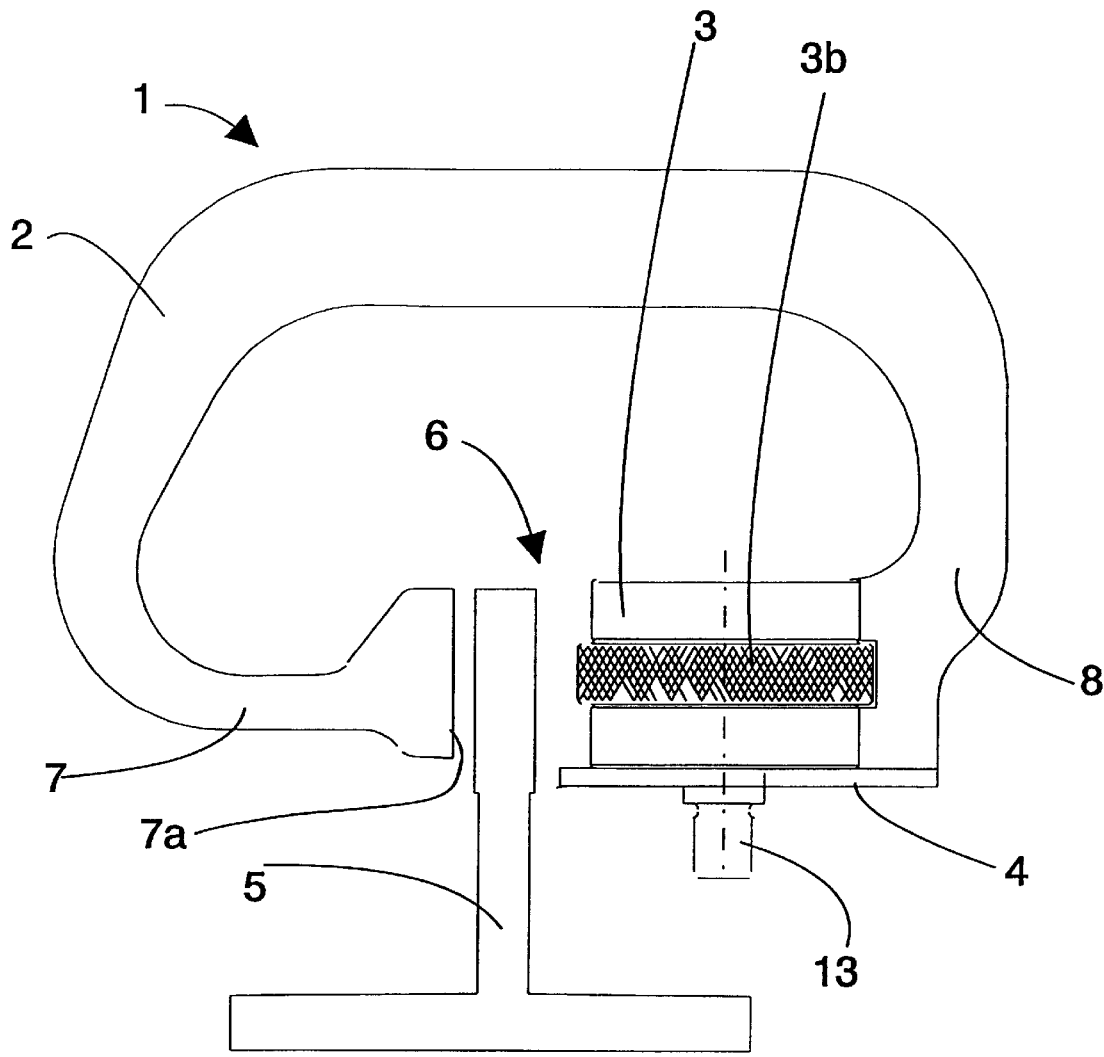
FIG. 3 presents a cross-section of the sliding safety gear.

FIG. 1 presents a sliding safety gear 1 according to the invention. The main parts of the sliding safety gear 1 are a frame 2, a force element 3 and a guard 4 supporting and guiding the force element. A more detailed view of the frame 2 is shown in FIG. 2. FIG. 3 shows a cross-section of the sliding safety gear 1. The elevator guide rail 5 is placed in the gap 6 of the sliding safety gear. The frame 2 is a flexible body, made e.g. of spring steel, of a shape substantially resembling the letter C. The first jam 7 of the C-shaped frame is provided with a braking surface 7a, while the second jam 8 is provided with a force element 3. At least one of the jams 7,8 is bent to the inside of the C-shape of the frame 2. Bending the jam to the inside of the C-shape compensates the tendency—resulting from the opening of the C-shape—of the braking surface to turn so that it meets the guide rail at one edge only. The braking surface 7a on the first jam is either implemented as an integral part of the frame or it is part of a brake pad attached to the first jam. The braking surface is preferably an integral part of the frame 2. The force element 3 is a roller or wedge movable along a track 9 on the second jam 8. In the drawings, the force element is shown as a roller 3. When the safety gear is mounted in place, the elevator guide rail is located between the braking surface 7a and the wedge or roller acting as a force element. The force element 3 is held on the track 9 in the second jam 8 by the guard 4. When a roller 3 is used as force element, the track 9 preferably has a curvilinear gradient at least in part of the path of the roller. When the force element is a wedge, the track is generally straight. The safety gear is activated by moving the force element along the sloping track 9 until it grips the guide rail. The track 9 is advantageously integrated with the frame 2 and, in a further preferred case, the track 9 is machined directly in the second jam 8 of the frame 2. The upper and lower ends of the frame are provided with notches 15, by which the safety gear is fastened to a mounting structure in the elevator car or car frame.

FIGS. 4, 5 and 6 present the safety gear 1 as seen from the direction of the gap between the jams 7,8 of the C-shaped frame, illustrating the gripping process. A guide rail 5 fixed in the elevator shaft is located in the gap. Normally, when the elevator is running up and down along the guide rails, there is no contact between the safety gear and the guide rail. In an overspeed situation, when the elevator is moving downward—the down direction is indicated by an arrow 10—or e.g. in a safety gear test, the safety gear grips the guide rail. The track 9. has a changing gradient, as is clearly shown in FIG. 2. The first part 9a of the track gradient, where a transmitting element connected to the overspeed governor of the elevator pulls the roller 3 upwards—the up direction being indicated by arrow 11—causing the roller to engage the guide rail, has a relatively large angle of inclination relative to the direction of the guide rail, preferably 10–11°. The middle part 9b of the track, where the roller moving on the track presses the guide rail between the roller and the braking surface, has a smaller angle of inclination, preferably 5–8°. The final compressive force applied by the safety gear to the guide rail is reached at the end of the middle part 9b. After the middle part 9b there is a short even part 9c, where the track is roughly parallel to the guide rail. At the end of the track there is a roller stopper 9d, which in a braking situation keeps the roller in a specified position in the longitudinal direction of the safety gear 1, preferably about midway between the ends of the safety gear. A preferred shape of the stopper 9d is one that provides support for the roller over a large area, for instance a concave cylinder sector surface having the same radius of curvature as the rolling surface 3a of the roller 3. To allow a better grip of the guide rail 5, the roller 3 may be provided with a roughened surface or a surface pattern raised from the roller surface. Such a roughened area or surface pattern raised from the roller surface is preferably implemented as a ring-shaped bossage 3b in the middle of the cylindrical surface of the roller, dividing its rolling surface 3a into two parts. The track 9 of the roller 3 must also comprise two parallel parts 9A, 9B, with a cut-out 9C between them that has a depth larger than the height of the bossage 3b, in which cut-out the bossage is to run. This cut-out can also act as a guide groove which guides the roller in the lateral direction by its bossage 3b.

FIGS. 4–6 illustrate the gripping process. In FIG. 4, the roller is still in its low position. The long guide hole 12 in the guard 4 (shown in FIG. 1) keeps the roller 3 in position at the lower end of the track 9. The roller is supported on the guard by its journal 13, which is placed in the guide hole 12. In FIG. 5, the roller 3 has ascended along the first part 9a of the track to the middle part 9b, where the roller movement presses the guide rail 5 more and more tightly between the roller 3 and the braking surface 7a. In FIG. 6, the roller has already reached the stopper 9d, where the roller can rotate. The roller presses the guide rail 5 against the braking surface 7a with full force. At the same time, the friction between the roller 3 and the frame 2 brakes the rotation of the roller in the stopper 9d. Thus, at the final stage of the gripping process, a dual braking action occurs in the sliding safety gear, viz., on the one hand, as the braking surface 7a is sliding along the guide rail 5 and, on the other hand, as the roller 3 is rotating in the stopper 9d.

Figure 7:
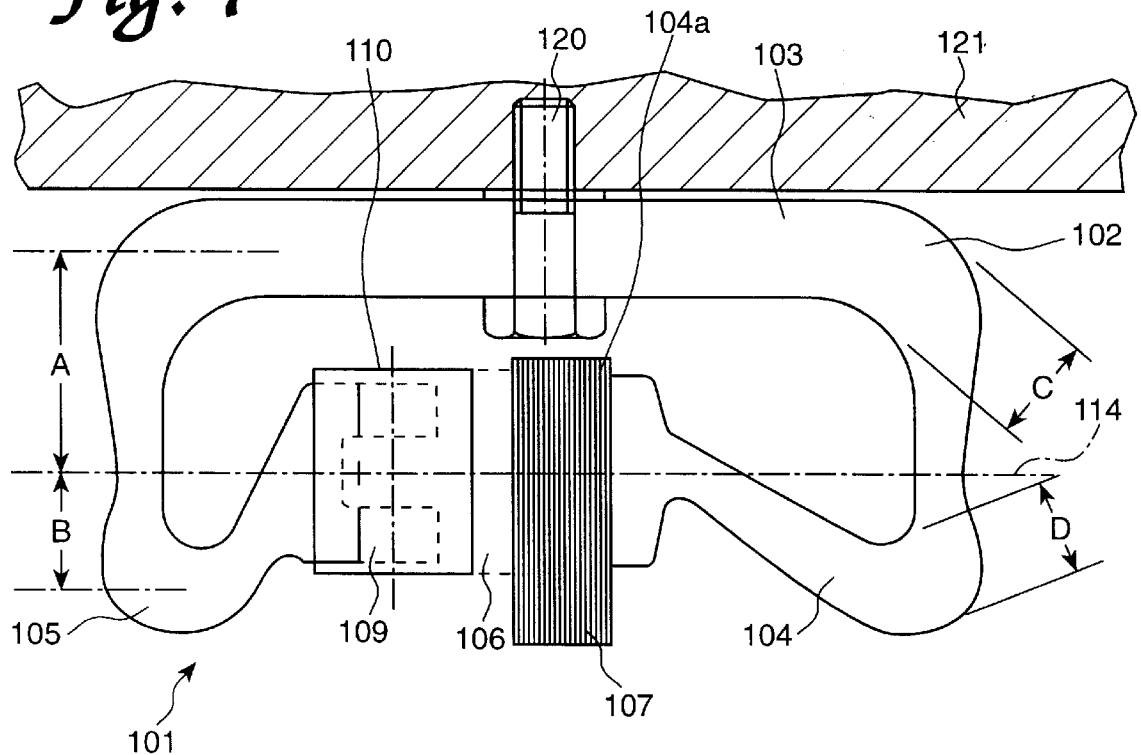
FIGS. 7–9 present another embodiment of the invention.
Figure 8:
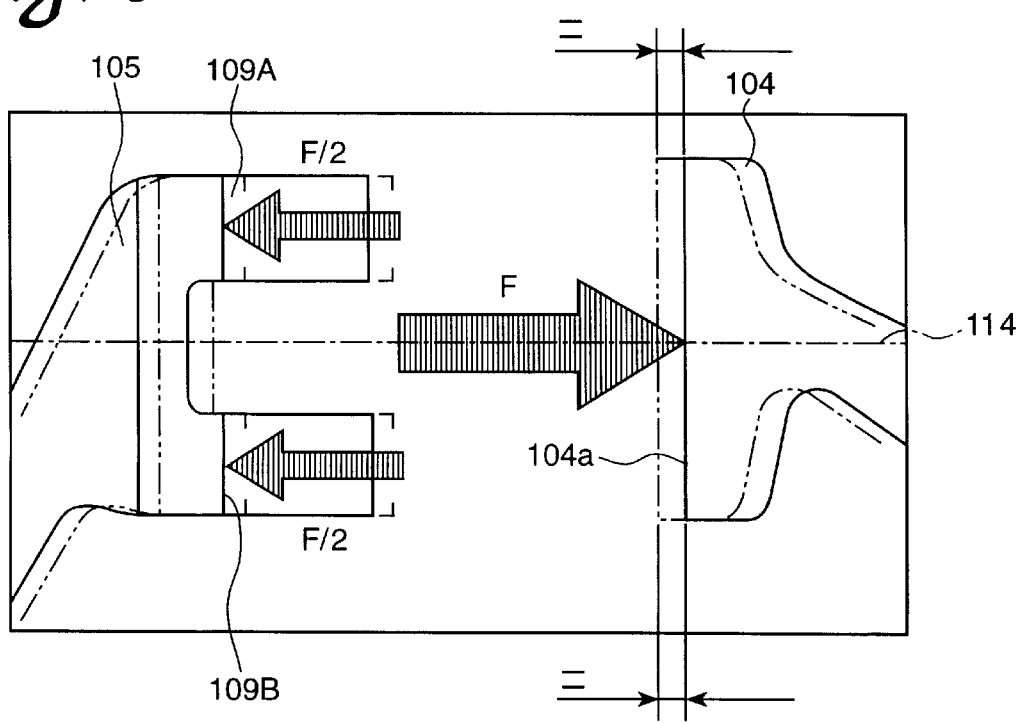
Figure 9:
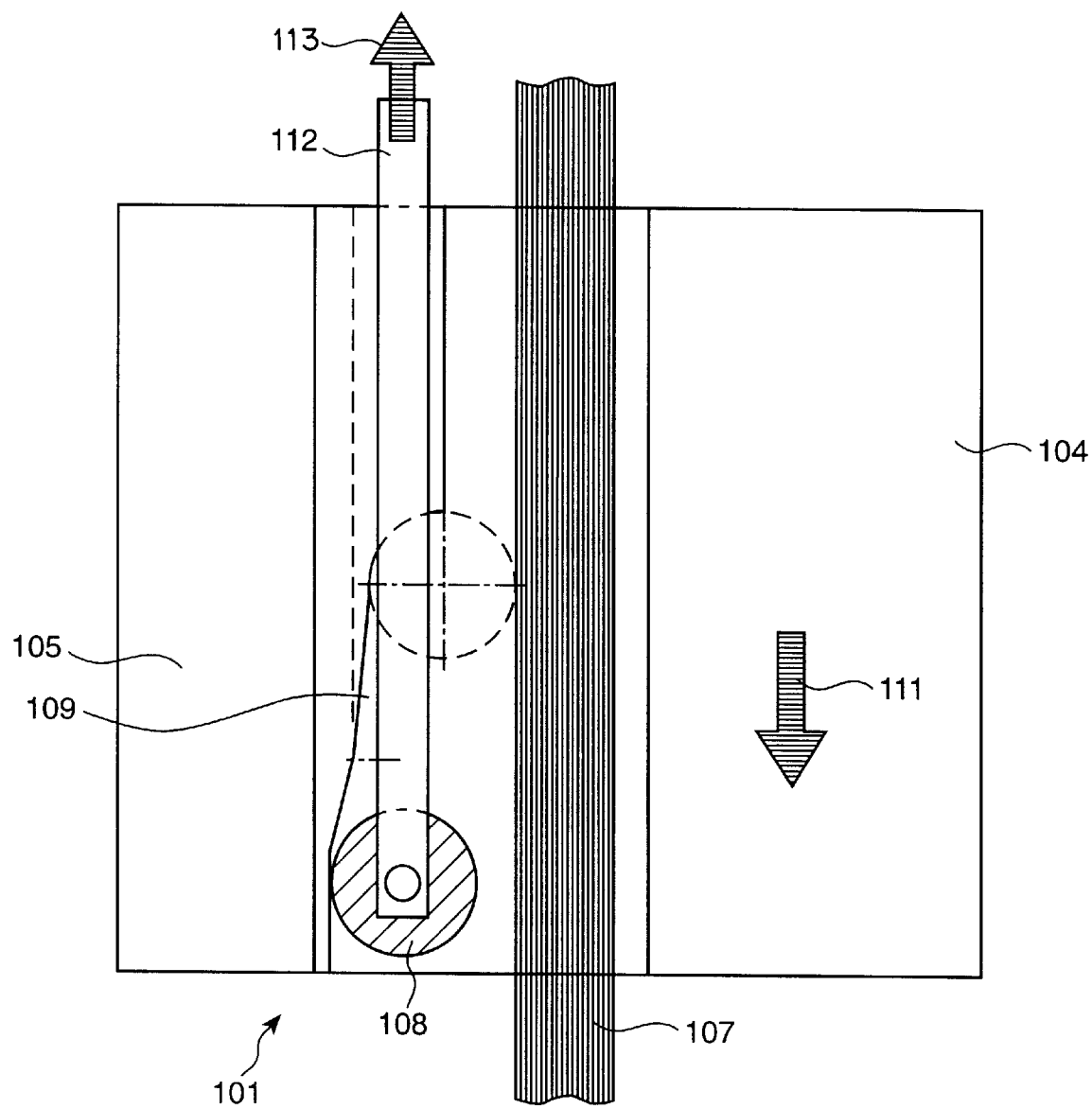

FIGS. 7–9 present another safety gear according to the invention. FIG. 7 shows a cross-section of the safety gear 101 and especially its frame 102. The cross-section is substantially the shape of the letter C. In cross-section, the back 103 of the C-shape is thicker than its jams 104,105. Inside the C-shape, at the ends of the jams 104,105 and between them, is a hollow 106 housing a wedge or a roller, which, when the safety gear is activated, is pressed against an elevator guide rail 107, thus acting as a force element. The safety gear 101 is attached by its back 103 with a bolt 120 or other suitable means to a load-bearing part 121 of the elevator car or counterweight.

The safety gear 101 starts braking when the force element, which in FIG. 9 is a roller 108, is brought into contact with the guide rail 107. When the force element meets the guide rail, it will move up along the track 109, getting more and more tightly crammed between the guide rail and the second jam 105, until finally the guide rail is squeezed between the force element engaging the rail from its second side and the braking surface 104a engaging the rail from its first side. As a result of the force element 108 being forced up along its track, the jams 104,105 of the safety gear 101 move farther apart from each other, the C-shape tends to open out, as it were. The line 114 of application of the force producing this opening movement of the jams passes through the braking surface 104a in a substantially perpendicular direction. This line 114 of application of the force also passes through the inside of the C-shape of the cross-section of the safety gear so that the back 103 of the C-shape remains on one side of the line while the jams 104,105 of the C-shape remain on the other side, at least partially. The gripping force of the safety gear consists of the frictional force acting via the braking surface 104a and, on the other hand, when the force element 108 is active. The force element 108 is placed in a box-like guide support 110, which also supports the force element to keep it in position. FIG. 8 presents a detail of the cross-section, showing the force components resulting from the movement of the force element and producing an opening effect on the C-shape. The frictional force braking the elevator is proportional to the force tending to open the C-shape. In the first jam 104, the effect of the force element produces a force F applied to the braking surface 104a in the direction of the line 114. In the second jam, the force element is supported by a track consisting of two parallel sub-tracks 109A,109B, with a supporting force acting in a direction opposite to force F. In a preferred case, the components of the supporting force applied to the parallel sub-tracks 109A,109B are of equal magnitude and therefore their magnitudes are F/2. The gradients of the sub-tracks may differ somewhat from each other. In the second jam the force element is supported. Since the safety gear frame acts as a spring, force F is substantially proportional to the displacement by which the C-shape opens out. The degree of the opening movement of the frame 102 and, on the other hand, the degree of bending of the jams 104,105 to the inside of the C-shape are adjusted by selecting the thicknesses of the various parts of the frame, e.g. the thicknesses C and D of the bends of jam 104, and via the design of the C-shape and its parts and the position of the line of application of the force. The design should be such that the line of application of the force passes through the thinner parts of the jams in a direction parallel to the back 103.

If the force element is a wedge, then the track 109 has a constant gradient, whereas if the force element is a roller, the track may have a changing gradient.

FIG. 9 presents the safety gear 101 as seen from the direction of the gap between the jams 104,105 of the C-shape. In the gap is a guide rail 107 fixed in place in the elevator shaft. Normally, when the elevator is travelling up and down along the guide rails, there is no contact between the safety gear and the guide rail. In an overspeed situation, when the elevator is moving down—the down direction is indicated by arrow 111—or e.g. in a safety gear test, the safety gear grips the guide rail. The force element is a roller 108. The track 109 has a changing gradient. The first part of the track gradient, where a transmitting element 112 connected to the overspeed governor of the elevator pulls the roller 108a upwards—the up direction being indicated by arrow 113—causing the roller to engage the guide rail, has a relatively large angle of inclination relative to the direction of the guide rail, preferably 10–11°. The middle part of the track, where the roller moving on the track presses the guide rail between the roller and the braking surface, has a smaller angle of inclination, preferably 5–8°. The final compressive force applied by the safety gear to the guide rail is reached at the end of the middle part. At the end of the track there is a roller stopper, which in a braking situation keeps the roller in a specified position in the longitudinal direction of the safety gear 101, preferably about midway between the ends of the safety gear. A preferred shape of the stopper is one that provides support for the roller over a large area, for instance a concave cylinder sector surface having the same radius of curvature as the rolling surface of the roller has.

It is obvious to the person skilled in the art that different embodiments of the invention are not limited to the examples described above but may instead be varied in the scope of the claims presented below.

We claim:

1. A sliding safety gear designed for braking by gripping an elevator or counterweight guide rail, comprising:
    a flexible frame for surrounding the guiding surfaces of the guide rail, said frame including first and second jams formed on ends thereof;
    a braking surface provided on the frame for engaging a first guide surface of the guide rail when the sliding safety gear is braking;
    a force element attached to the frame for engaging a second guide surface of the guide rail when the sliding safety gear is braking, wherein the cross-section of the frame is substantially in the shape of a C forming a C-shaped hollow therein and at least one of the jams of the frame is bent into the inside of the C-shaped hollow.

2. The sliding safety gear as defined in claim 1, wherein the braking surface is located on one of the first and second jams while the force element is located on the other of the first and second jams.

3. The sliding safety gear as defined in claim 1, wherein the flexible frame is made of spring steel.

4. The sliding safety gear as defined in claim 1, wherein a gap is formed between said first and second jams, said gap is located adjacent to said C-shaped hollow and is in communication therewith.

5. The sliding safety gear as defined in claim 1, wherein said frame includes a back portion opposite said first and second jams, said back portion lies in a plane generally parallel to a plane of at least one of said first and second jams.

6. The sliding safety gear as defined in claim 1, said flexible frame further comprising:
    a back wall securable to the elevator, said back wall lying in a first plane;
    first and second side walls attached to the first and second ends of said back wall, respectively; and
    said first and second jams are attached to ends of said first and second side walls, respectively, at least one of said first and second jams lies in a plane generally parallel to said back wall.

7. The sliding safety gear as defined in claim 1, wherein the force element is a roller.

8. The sliding safety gear as defined in claim 7, wherein friction between the roller and the frame brakes the rotation of the roller and a braking effect of the sliding safety gear is generated by the braking surface being slid along the guide rail and the roller rotating on the frame.

9. The sliding safety as defined in claim 7, wherein a roller track is formed on one of the first and second jams, the roller track having a curvilinear gradient at least in a part of the path of the roller.

10. The sliding safety gear as defined in claim 9, wherein the roller track terminates in a roller stopper, and wherein in a braking situation, the roller stopper keeps the roller in a specified position in the longitudinal direction of the safety gear, said stopper having a shape that provides support for the roller over a large area.

11. The sliding safety gear as defined in claim 9, wherein the roller is provided with a roughened surface or a surface pattern raised from the roller surface, said roughened surface or surface pattern being a ring-shaped bossage located in the middle of the cylindrical surface of the roller.

12. The sliding safety gear as defined in claim 10, wherein said roller stopper keeps the roller at a location generally midway between ends of the safety gear, and wherein said roller stopper has a surface in the shape of a concave cylinder sector having a same radius of curvature as a rolling surface of the roller.

13. A sliding safety gear designed for braking by gripping an elevator or counterweight guide rail, comprising:
    a flexible frame for surrounding the guiding surfaces of the guide rail, said frame including first and second jams formed on ends thereof;
    a braking surface provided on the frame for engaging a first guide surface of the guide rail when the sliding safety gear is braking;
    a force element attached to the frame for engaging a second guide surface of the guide rail when the sliding safety gear is braking, wherein the cross-section of the frame is substantially in the shape of a C having an arc extending greater than 180 degrees, said C-shaped cross-section of said frame forming a C-shaped hollow.

14. The sliding safety gear as defined in claim 13, wherein at least one of the jams is bent into the inside of the C-shaped hollow.

* * * * *